United States Patent [19]

Beall

[11] Patent Number: 4,650,590

[45] Date of Patent: Mar. 17, 1987

[54] METHOD OF IMMOBILIZING ORGANIC CONTAMINANTS TO FORM NON-FLOWABLE MATRIX THEREFROM

[75] Inventor: Gary W. Beall, Austin, Tex.

[73] Assignee: Radecca, Inc., Austin, Tex.

[21] Appl. No.: 759,938

[22] Filed: Jul. 29, 1985

Related U.S. Application Data

[63] Continuation of Ser. No. 415,423, Sep. 7, 1982, abandoned, which is a continuation-in-part of Ser. No. 307,300, Sep. 30, 1981, abandoned.

[51] Int. Cl.$^4$ .............................................. B01D 15/00
[52] U.S. Cl. .................................... 210/691; 210/751; 210/908
[58] Field of Search .................. 106/85, 900, DIG. 1; 210/679, 680, 691, 708, 747, 751, 170, 908-910, 924; 252/323, 428, 430

[56] References Cited

U.S. PATENT DOCUMENTS

| | | | |
|---|---|---|---|
| 2,367,384 | 1/1945 | Tymstra et al. | 210/680 |
| 3,487,928 | 1/1970 | Canevari | 252/323 |
| 4,149,968 | 4/1979 | Kupiec et al. | 210/751 |
| 4,167,481 | 9/1979 | Cremers et al. | 210/679 |
| 4,230,568 | 10/1980 | Chappell | 210/751 |

FOREIGN PATENT DOCUMENTS 1231266 9/1960 France.
920797 3/1963 United Kingdom.

*Primary Examiner*—Ivars Cintins
*Attorney, Agent, or Firm*—Stefan J. Klauber

[57] ABSTRACT

A method is provided for treating polar or aqueous fluid compositions containing an amount of an organic contaminant to immobilize the contaminant by forming a nonflowable matrix containing the contaminant. The non-flowable matrix can be easily disposed of. The method comprises adding a sufficient amount of organoclay to the fluid composition to absorb substantially all of the organic contaminant. A sufficient amount of solid adsorbent is added to the composition to absorb or react with substantially all of the polar fluid or water to form a substantially non-flowable matrix. Typically, such polar fluids or aqueous compositions are in emulsion form with the organic contaminant, and the addition of the organoclay breaks the emulsion, permitting removal of a portion of the water or polar fluid from the composition to thereby reduce the volume to be disposed of. The method of this invention immobilizes the organic contaminant, in such a manner that it is non-leachable from the matrix.

18 Claims, 4 Drawing Figures

Sequential Leaching of a Solidified Waste Containing 1% Hexachloropentadiene and 1% Ethyl Parathion

METHOD OF IMMOBILIZING ORGANIC CONTAMINANTS TO FORM NON-FLOWABLE MATRIX THEREFROM

RELATED APPLICATIONS

This application is a continuation, of application Ser. No. 415,423, filed Sept. 7, 1982, which is a continuation-in-part of my copending application Ser. No. 307,300, filed on Sept. 30, 1981, and entitled "ORGANOCLAY WASTE DISPOSAL METHOD", both now abandoned. The entire disclosure of this parent application is incorporated herein by reference.

BACKGROUND OF THE INVENTION

1. Field of the Invention

This invention relates to a method for treating waste fluids containing organic contaminants to solidify the waste fluid to facilitate disposal; and more particularly relates to the forming of a substantially non-flowable matrix from an aqueous waste fluid containing organic contaminants.

2. Prior Art

One of the major problems facing cities, chemical manufacturers, and industries using various chemicals is waste disposal. This problem can generally be divided into three major categories: solidification of fluid waste, disposal of waste by land burial, and remedial action around existing disposal sites which are now leaking.

The use of finely divided or porous solid materials to solidify fluid wastes and spills is well known. Generally, the purpose of solidification is to aid in the disposal of fluid wastes or spills. Among the materials which have been used for solidification are cement, kiln dust, fly ash, soil, and sawdust. These materials have numerous disadvantages. The volume of solidified waste is usually four to five times the volume of the original waste. Additionally, these dusts and the like generally have no specific affinity for one component of the waste relative to another and, even after solidification, liquid components may leach from the waste. Liquid wastes containing five percent (5%) or more of organic contaminants also disrupt the cementatious reactions that help stabilize cement and kiln dust waste products.

These current techniques of waste solidification generally physically trap the organic waste in a solid matrix. When the solid matrix is breached, the organic waste is released unabated to the ground water. Another problem that plagues this method of waste disposal is that during the solidification process, the liquid phase and the solidification medium have a tendency to separate. This renders the method ineffective at stabilizing the waste. One method that has been reported for overcoming this problem is to mix small portions of bentonite with portland cement; this eliminates the aqueous phase separation problem. The bentonite, however, does not adsorb the organic waste. This technology still suffers from the inadequacy of not binding the organic waste other than by physically trapping it.

Prior art of which applicant is aware which relates to solidification of fluid waste are as follows:

British Pat. No. 1,280,373 to Davies et al describes the separation of an oil from an emulsion. Several methods are enumerated for forming the emulsion into two layers for evaporation of the aqueous layer. One of these methods utilizes a mixture of surface-active clay and a polyelectrolyte. First the surface-active clay and then a polyelectrolyte is added to the emulsion. Bentonite is described as a particularly suitable clay. Polyamides are described as particularly suitable polyelectrolytes.

U.S. Pat. No. 3,274,784 to Shock et al, describes a method for the disposal of radioactive waste. This is accomplished by forming a solidifiable composition containing the radioactive waste in the form of a solution or slurry in water and mixing with clay minerals, lime and caustic present in proportions to provide a solid mass on standing. The radioactive wastes contain fissionable products such as strontium, cesium, ruthenium, etc. The preferred clay is calcium montmorillonite. Bentonite was found to require temperatures too high for solidification to take place. Natural clays may also be used.

U.S. Pat. No. 3,948,770 to Goodrich et al describes the use of an anionic polyelectrolyte and a sodium or a calcium montmorillonite clay to effectively separate water oil droplets in sea water.

U.S. Pat. No. 4,033,764 to Colegate et al describes scavenging metal ions from solution by means of a complexing agent comprised of an inorganic substrate, such as a clay mineral, with covalent organic molecules, such as onium compounds, chemically bonded to the substrate.

U.S. Pat. No. 4,149,968 to Kupiec, describes the use of bentonite clays and portland cement in aqueous solutions containing polluting materials, e.g. metallic ions, to form a solid mass.

Japanese No. 015979 to Koyo Kasei KK, describes the detoxification of PCB-containing waste water by mixing the waste water with diatomaceous earth, bentonite or other clay which has been made lipophilic, and then mixing with cement, water, and aggregate. In the method, less than 20% PCB waste liquor, sludges, etc., are mixed with the diatomaceous earth, bentonite, or clay minerals of inorganic fine particles previously made lipophilic by surface treatment. The PCB's are allowed to be adsorbed on the mineral, and then the resulting materials are mixed with cement, water, and aggregate. Diffusing or leaching appears to be reduced. Activated carbon or silica gel may also be used in place of the clay.

Organoclays are well-known in the art, see for example the following U.S. patents:
U.S. Pat. No. 2,531,427 to Hauser;
U.S. Pat. No. 2,966,506 to Jordan;
U.S. Pat. No. 3,422,185 to Kuritzkef;
U.S. Pat. No. 3,974,125 to Oswald;
U.S. Pat. No. 4,081,496 to Finlayson; and
U.S. Pat. No. 4,105,578 to Finlayson et al None of these aforementioned references teach or suggest the use of these organoclays to immobilize organic contaminants to facilitate their disposal.

SUMMARY AND OBJECTS OF THE INVENTION

A method is provided for treating polar or aqueous fluid compositions containing an amount of an organic contaminant to immobilize the contaminant by forming a nonflowable matrix containing the contaminant. The non-flowable matrix can be easily disposed of. The method comprises adding a sufficient amount of an organoclay to the fluid composition to absorb substantially all of the organic contaminant. A sufficient amount of solid adsorbent is added to the composition to absorb or react with substantially all of the polar fluid or water to form a substantially non-flowable matrix. Typically, such polar or aqueous compositions are in emulsion form with the organic contaminant and the addition of the organoclay breaks the emulsion, permitting removal of a portion of the water or polar fluid from the composition to thereby reduce the volume to be disposed of. The method of this invention immobilizes the organic contaminant, in such a manner that it is non-leachable from the matrix.

It is thus an object of this invention to provide a method for treating fluid wastes, e.g. ponds, streams, etc., to immobilize the organic contaminants contained therein to faciliate disposal.

It is a further object of this invention to provide a method for treating both aqueous and polar fluid waste containing such organic contaminants to facilitate disposal.

It is a further object of this invention to provide a method for immobilizing organic contaminants contained in a fluid waste, so that they do not leach out into the environment, which method substantially reduces the volume of the waste to facilitate disposal.

It is a further object of this invention to provide a method for treating fluid waste containing organic contaminants emulsified therein, to "break" the emulsion to permit removal of of water to reduce the volume and to immobilize the organic contaminants.

It is a yet further object of this invention to immobilize organic contaminants contained in a fluid waste so that the volatility of the organic contaminant is substantially reduced.

It is a still further object of this invention, to provide a method for treating fluid waste containing organic contaminants, to substantially reduce the volume of the waste so that it may be more economically transported to a waste site and disposed of.

It is yet a further object of this invention, to provide a method for treating fluid waste to form a substantially nonflowable matrix.

It is a further object of this invention, to provide a method for treating fluid waste to immobilize the organic contaminants contained therein, using materials which have a specific affinity for the organic contaminant, and consequently, preferentially absorb the contaminants to prevent leaching and volatilization.

It is a yet further object of this invention, to provide a substantially non-flowable matrix containing organic contaminants which can be easily disposed of.

DETAILED DESCRIPTION OF THE INVENTION

Figure 1:
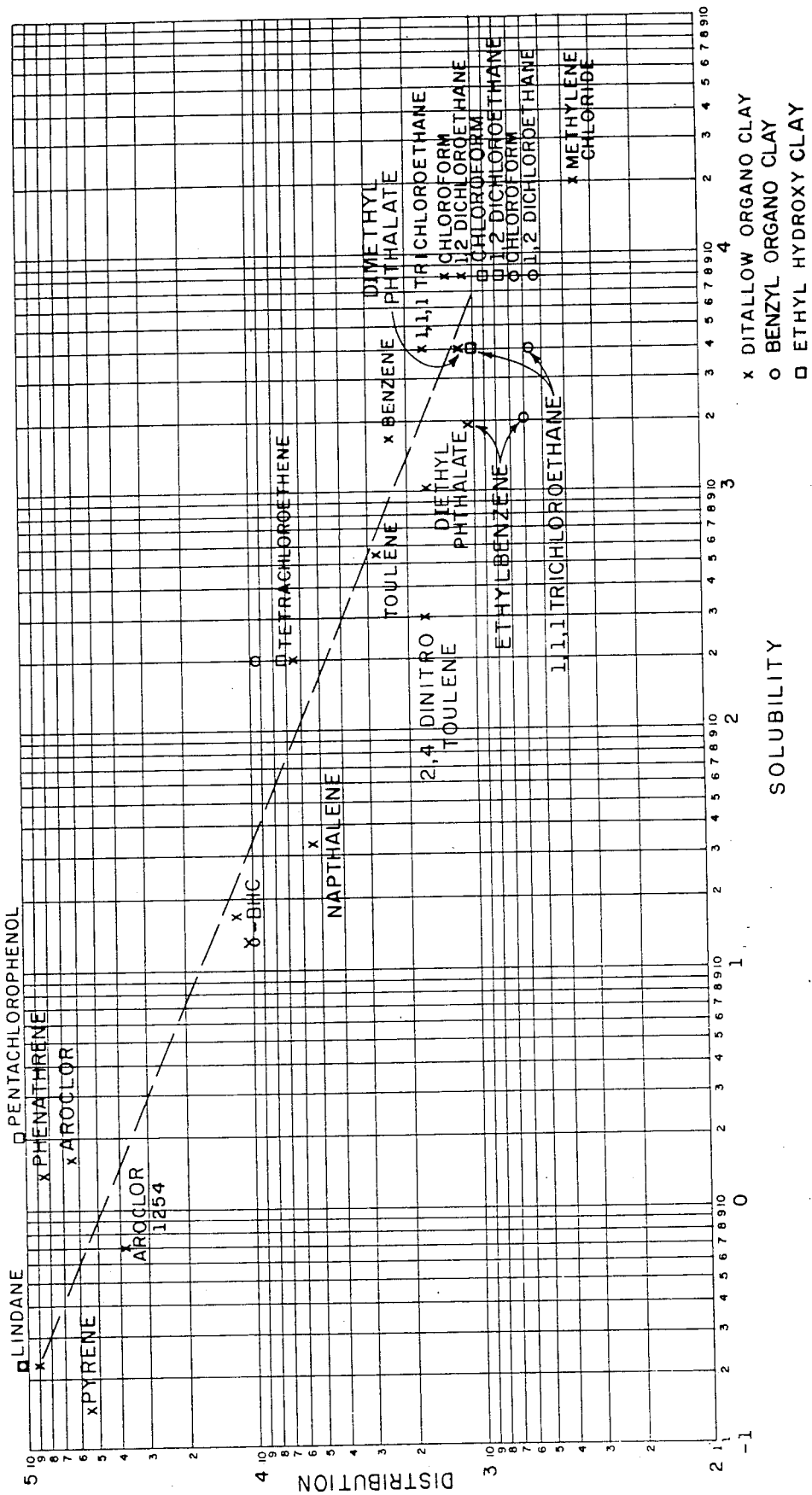
FIG. 1 is a graph showing the relationship of the logarithm of the distribution co-efficient of certain organic contaminants with the logarithm of their solubilities in water.

Organoclays are well known in the art as exemplified by the aforementioned patents to Hauser, Jordan, Kuritzkey, Oswald et al, Finlayson, and Finlayson et al, the entire disclosures of which are incorporated herein by reference. In this invention, the term "organoclay" refers to various clay types, e.g. smectites, that have organo ammonium ions substituted for cations between the clay layers. The term "organo ammonium ion substituted" refers to a substituted ammonium ion in which one or more hydrogen atoms are replaced by an organic group.

The organoclays are essentially solid compounds that have an inorganic and organic phase.

The preferred clay substrates for use in this invention are the smectite-type clays, particularly the smectite-type clays which have a cation exchange capacity of at least 75 millequivalents per 100 grams of clay. Useful clays for such purposes include the naturally occuring Wyoming variety of swelling bentonite and similar clays, and hectorite, which is a swelling magnesium-lithium silicate clay. The clays, are preferably converted to the sodium form if they are not already in this form. This can be effected, by a cation exchange reaction with a soluble sodium compound. These methods are well-known in the art. Smectite-type clays prepared synthetically can also be utilized, such as montomorillonite, bentonite, beidelite, hectorite, saponite, and stevensite.

The organoclays useful in this invention include those set forth in U.S. Pat. No. 2,531,427 to Hauser. These organoclays are modified clays which exhibit in organic liquids, some of those characteristics which untreated clays exhibit in water. For example, they will swell in many organic liquids and will form stable gells and colloidal dispersions.

Generally, the quaternary ammonium salt substituted onto the clay has organic groups attached to the clay which will range from aliphatic hydrocarbon of from 1 to 24 carbons to aromatic organic molecules, such as benzyl groups that could have a host of groups substituted on the benzyl ring. The number of benzyl versus straight chain hydrocarbons substituted on the ammonium ion can vary from 3 to 0 (i.e. dimethyl dioctododecyl 0:2, methyl benzyl dioctododecyl 1:2, dibenzyl dioctobenzyl 1:1, tribenzyl octadecyl 3:1, methyl dibenzyl octodecyl 2:1). The amount of alkyl ammonium salt substituted on the clay can vary between 0.5% to 50%.

In particular, the preferred organoclay used in this invention comprises one or more of the following quaternary ammonium cation modified montmorillonite clays:

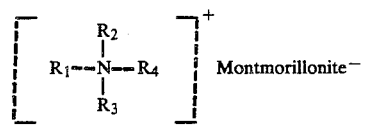

wherein $R_1$ is an alkyl group having at least 10 carbon atoms and up to, for example, 24 carbon atoms, and preferably having a chain length of from 12 to 18 carbon atoms; $R_2$ is hydrogen, benzyl or an alkyl group of at least 10 carbon atoms and up to, for example, 24 carbon atoms, and preferably from 12 to 18 carbon atoms; and $R_3$ and $R_4$ are each hydrogen or lower alkyl groups, viz., they contain carbon chains of from 1 to 4 atoms, and preferably are methyl groups.

Other organoclays utilizable in the invention include benzyl organoclays such as dimethyl benzyl (hydrogenated tallow) ammonium bentonite; methyl benzyl di(-hydrogenated tallow) ammonium bentonite; and more generally quaternary ammonium cation modified montmorillonite clays represented by the formula:

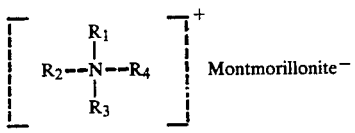

wherein $R_1$ is $CH_3$ or $C_6H_5CH_2$; $R_2$ is $C_6H_5CH_2$; and $R_5$ and $R_4$ are alkyl groups containing long chain alkyl radicals having 14 to 22 carbon atoms, and most preferably wherein 20 to 35% of said long chain alkyl radicals contain 16 carbon atoms and 60% to 75% of said long chain alkyl radicals contain 18 carbon atoms.

The montmorillonite clays which may be so modified are the principal constituents of bentonite rock, and have the chemical compositions and characteristics described, for example, in Berry and Mason, "Mineralogy", 1959, pp. 508–509. Modified montmorillonite clays of this type in (i.e. organoclays) are commercially available from Southern Clay Products, Inc., Gonzales, Tex. under such trade designations as CLAYTONE 34 and 40, and are available from NL Industries, Inc., New York, N.Y. under such trade designations as BENTONE 27, 34, and 38. The preferred organoclays utilized in this invention, are the higher dialkyl dimethyl ammonium organoclays such as dimethyl di(hydrogenated tallow) ammonium bentonite; the benzyl ammonium organoclays, such as dimethyl benzyl (hydrogenated tallow) ammonium bentonite; and ethylhydroxy ammonium organoclays such as methylbis (2-hydroxyethyl) octodecyl ammonium bentonite.

The fluid waste, which may be an aqueous waste or a waste fluid whose carrier fluid is a polar composition, e.g. aliphatic alcohol, etc. contains an amount of organic contaminant. Typical organic contaminants are the chlorinated organic compounds; e.g. DDT, BDD, DDE, 2, 4-dichloro-phenol, tetrachloroethylene, and other organics such as benzene, toluene, methylene chloride, chloroform, 1, 2 dichloroethane 1, 1, 1- trichloroethane, trichloroethylene, tetrachloro ethylene, 2-nitrophenol, pentachlorophenol, dimethy phthalate, Lindane, Arochlor-1254, ethyl benzene, HCP, parathion, dichlorobenzene, hexachlorocyclopentadiene, ethylparathion, 2, 4-dinitrotoluene, naphtalene, pyrene, etc.

In the method of this invention, a sufficient amount of the organoclay is added to the aqueous or polar fluid composition to adsorb substantially all of the organic contaminants on the organoclay. Preferably, the amount of organoclay is at least about one percent (1%) by weight of the amount of organic contaminant and most preferably at least about five percent (5%) by weight of the organic contaminant. If too little organoclay is used, there will be insufficient solidification. The upper limit of organoclay is primarily dictated by cost. For general guidance, however, about ten percent (10%) by weight of the amount of the organic contaminant is a preferred upper limit.

The organoclay is mixed thoroughly with the fluid waste. The temperature at which the organoclay is mixed with the waste is not critical, with room temperature being preferred for obvious cost considerations.

The organoclay, upon mixing in the fluid waste, swells as the organic contaminant molecules are sorbed into and onto the organoclay. All current solidification technology only physically traps the organic contaminant molecules in voids in a solid matrix. The use of the organoclay helps to overcome this problem and tends to prevent separation of the organic contaminants during the solidification process. The organoclay additionally fixes the organic contaminant compounds through absorption involving partitioning of the organic molecules of the contaminant into the organoclay. This invention retains the advantages of retarding phase separation exhibited by the use of untreated bentonite and adds the extra advantage of fixing the organic contaminant in a physical chemical way rather than merely occluding it. This results in a solid phase that is far less leachable than with other known techniques.

The organic molecules of the contaminant preferably partition into the organic phase of the organoclay versus the aqueous phase or polar fluid phase. The magnitude of organic partitioning of a given organic molecule into the organoclay over, for example, the aqueous phase, can be predicted qualitatively by the solubility of the organic molecule in the aqueous phase. That is to say, an organic molecule that is very insoluble in an aqueous phase will partition very strongly into the organoclay relative to a more soluble organic molecule. This partitioning phenomenom also follows chromatagraphic theory which allows precise predictions of how organic molecules will migrate through a bed of organoclay. FIG. 1 shows the linear relationship of distribution co-efficients for several key organic species with three forms of organoclay. The distribution coefficients equals the amount of organic adsorbed in the clay divided by the amount left in solution times the volume of the solution divided by the mass of the clay. The aqueous solution contains the organics listed in FIG. 1. Generally, the amount in solution depends on solubility.

Broadly, the next step in the method of treating the waste fluid or liquor is adding a sufficient amount of solid adsorbent to adsorb or react with substantially all of the water therein to form a substantially non-flowable matrix. Solid adsorbants that may be utilized in this invention are portland cement, kiln dust, fly ash, clay, soil or attapulgite or mixtures thereof, e.g. attapulgite and cement. The appropriate ratio of solid adsorbent to be added to the organoclay waste mixture can vary from about zero (0) (when the organoclay alone is sufficient to solidify the waste stream) up to fifty percent (50%) by weight of the organic contaminant, although up to about one-hundred percent (100%) by weight of the organic contaminant may be added. The preferred lower range is about ten percent (10%) solid adsorbent. The addition of the solid adsorbant solidifys the mixture into a substantially non-flowable matrix containing an amount of water and an amount of organic contaminant molecules partitioned and bound within the organic phase of the organoclay portion of the solid matrix.

In a preferred embodiment of this invention, after the step of adding the organoclay, a portion of the water or polar fluid is removed, for example, by decanting or otherwise separating the fluid from the composition. Such procedure substantially reduces the volume of the solidified matrix. The organoclay when added to the fluid waste composition tends to break organic contaminant water emulsions. The organoclays are very effective at breaking emulsions at extremely low dose rates of organoclay. The breaking of the emulsion is particularly useful if the waste is to be solidified, for less mass must be solidified when water is removed, and this therefore provides for decreased cost in transportation and disposal. The water can also be recovered for further use. Additionally, this water removal or decanting step provides for the waste being incinerated at considerable savings since the BTU value of the waste has increased substantially by the exclusion of water. Still further, the organics left in the waste mass can be recovered for reuse and the organoclay regenerated.

Another aspect of this invention is providing a substantially non-flowable matrix comprising an amount of water or polar fluid, an amount of organic contaminant in the water or polar fluid, a sufficient amount of organoclay to absorb substantially all of the contaminants, and a sufficient amount of solid adsorbant to adsorb or react with substantailly all of the water or polar fluid to thereby form the substantially non-flowable matrix.

The method of this invention provides for several advantages which include substantially reducing the volume and mass of a finally solidified product compared to known prior art methods of solidifying waste. This yields substantial savings in mixing, transportation and disposal site costs. Additionally, the organic contaminant/water emulsions can be broken by the use of the organoclays, thus yielding further volume reduction and allowing water to be returned to the plant for further use. Removal of water also makes incineration more feasible since the solid matrix has a high BTU value. Still further, volatile emissions originating from the waste mass are substantially reduced by the method of this invention. This is important for the health and safety of workers and of residents who live near the disposal site. And finally, the leach rates of the waste are substantially reduced, thus lowering the environmental liability associated with disposal.

EXAMPLE 1

In order to demonstrate the efficacy of the organoclay used in this invention, several batch sorption experiments were performed with two forms of higher dialkyl dimethyl organoclay and compared to untreated montmorillonite sorption. These were conducted with 100:1 solution to solid ratio. The following Tables 1, 2 and 3 are a summary of these studies showing results from batch equilibration sorption studies of a montmorillonite, which has not been rendered into an organoclay, CLAYTONE ® 34, and CLAYTONE ® 40 respectively. CLAYTONE ® 34 and CLAYTONE ® 40 are organoclays, each being a dimethyl di(hydrogenated tallow) ammonium bentonite product, available from Southern Clay Products, Inc. of Gonzales, Tex.

It can be seen that extremely efficient removal occurs for all of the listed organics with the organoclays. The analyses for the majority of compounds in Tables 1, 2 and 3 were conducted by standard gas chromatographic techniques. The data for benzene, toluene and methylene chloride in these Tables are less accurate because the measurements were conducted by determining only the total organic carbon concentration.

TABLE 1

| Organic Species | Inlet Concentrations Spiking Level (ppb) (ug/1) | Concentration in Blank (ppb) (ug/1) | 24 Hours Batch Equilibrations Concentration | | | 48 Hours Batch Equilibration Concentration | | |
|---|---|---|---|---|---|---|---|---|
| | | | Amount Recovered (ppb) (ug/) | Blank (ppb) (ug/1) | % Sorbed | Amount Recovered (ppb) (ug/1) | Blank (ppb) (ug/1) | % Sorbed |
| Aroclor 1254 | 3.65 | 0 | 4.95 | 0 | 0 | 13 | 0 | 0 |
| p,p'-DDT | 0.88 | 0 | 0.82 | 0 | 7 | 0.96 | 0 | 0 |
| o,p'-DDT | 1.77 | 0 | 2.11 | 0 | 0 | 2.16 | 0 | 0 |
| p,p'DDD | 0.75 | 0 | 0175 | 0 | 0 | 0.88 | 0 | 0 |
| o,p'DDD | 0.43 | 0 | 0.46 | 0 | 0 | 0.36 | 0 | 16 |
| p,p'-DDE | 0.56 | 0 | 0.68 | 0 | 0 | 0.86 | 0 | 0 |
| o,p'-DDE | 0.17 | 0 | 0.20 | 0 | 0 | 0.15 | 0 | 12 |
| 2,4-Dichlorophenol | 18,000 | 0 | 11,000 | 0 | 39 | 11,000 | 0 | 39 |
| Tetrachloroethylene | 318 | 0.20 | 278 | 2.10 | 13 | 331 | 0.70 | 0 |
| Benzene | $1.35 \times 10^5$ | 0 | $1.35 \times 10^5$ | 0 | 0 | | | |
| Toluene | $5.4 \times 10^4$ | 0 | $4.54 \times 10^4$ | 8 | 16 | | | |
| Methylene Chloride | $5.12 \times 10^5$ | 0 | $4.40 \times 10^5$ | 0 | 14 | | | |

TABLE 2

| Organic Species | Inlet Concentrations Spiking Level (ppb) (ug/1) | Concentration in Blank (ppb) (ug/1) | 24 Hours Batch Equilibrations Concentration | | | 48 Hours Batch Equilibration Concentration | | |
|---|---|---|---|---|---|---|---|---|
| | | | Amount Recovered (ppb) (ug/) | Blank (ppb) (ug/1) | % Sorbed | Amount Recovered (ppb) (ug/1) | Blank (ppb) (ug/1) | % Sorbed |
| Aroclor 1254 | 3.65 | 0 | 0 | 0 | 100 | 0 | 0 | 100 |
| p,p'-DDT | 0.88 | 0 | 0 | 0 | 100 | 0 | 0 | 100 |
| o,p'-DDT | 1.77 | 0 | 0 | 0 | 100 | 0 | 0 | 100 |
| p,p'DDD | 0.75 | 0 | 0 | 0 | 100 | 0 | 0 | 100 |
| o,p'DDD | 0.43 | 0 | 0 | 0 | 100 | 0 | 0 | 100 |
| p,p'-DDE | 0.56 | 0 | 0 | 0 | 100 | 0 | 0 | 100 |
| o,p'-DDE | 0.17 | 0 | 0 | 0 | 100 | 0 | 0 | 100 |
| 2,4-Dichlorophenol | 18,000 | 0 | 200 | 0 | 99 | 200 | 0 | 99 |
| Tetrachloroethylene | 318 | 0.20 | 25 | 0.3 | 92 | 24 | 0.2 | 92 |
| Benzene | $13.5 \times 10^5$ | 0 | 5400 | 0 | 96 | | | |
| Toluene | $5.4 \times 10^4$ | 0 | 2160 | 0 | 96 | | | |
| Methylene Chloride | $5.12 \times 10^5$ | 0 | $1.08 \times 10^5$ | 0 | 79 | | | |

TABLE 3

| Organic Species | Inlet Concentrations Spiking Level (ppb) (ug/1) | Concentration in Blank (ppb) (ug/1) | 24 Hours Batch Equilibrations Concentration | | | 48 Hours Batch Equilibration Concentration | | |
|---|---|---|---|---|---|---|---|---|
| | | | Amount Recovered (ppb) (ug/) | Blank (ppb) (ug/1) | % Sorbed | Amount Recovered (ppb) (ug/1) | Blank (ppb) (ug/1) | % Sorbed |
| Aroclor 1254 | 3.65 | 0 | 0 | 0 | 100 | 0 | 0 | 100 |
| p,p'-DDT | 0.88 | 0 | 0 | 0 | 100 | 0 | 0 | 100 |
| o,p'-DDT | 1.77 | 0 | 0 | 0 | 100 | 0 | 0 | 100 |
| p,p'DDD | 0.75 | 0 | 0 | 0 | 100 | 0 | 0 | 100 |
| o,p'DDD | 0.43 | 0 | 0 | 0 | 100 | 0 | 0 | 100 |
| p,p'-DDE | 0.56 | 0 | 0 | 0 | 100 | 0 | 0 | 100 |
| o,p'-DDE | 0.17 | 0 | 0 | 0 | 100 | 0 | 0 | 100 |
| 2,4-Dichlorophenol | 18,000 | 0 | 200 | 0 | 99 | 200 | 0 | 99 |
| Tetrachloroethylene | 318 | 0.20 | 27 | 0.3 | 92 | 25 | 0.30 | 92 |
| Benzene | $1.35 \times 10^5$ | 0 | 3420 | 0 | 76 | | | |
| Toluene | $5.4 \times 10^4$ | 0 | 1620 | 0 | 97 | | | |
| Methylene Chloride | $5.12 \times 10^5$ | 0 | $1.13 \times 10^5$ | 0 | 78 | | | |

EXAMPLE 2

The following Table 4 provides an initial comparison of literature values of sorption capacities of activated charcoal for several organic compounds and sorption capacities from experimental data for the dimethyl ditallow form of the organoclay for these organic compounds. The data for charcoal was taken from EPA Report 600/8-80-23 and for the organoclay from data based on a single experimental value per compound.

TABLE 4

| | Sorption Capacities (mg/g) | |
|---|---|---|
| Organic Compound | Charcoal | Organo-Clay |
| Benzene | 0.1 | 18 |
| Toluene | 25.0 | 6 |
| Methylene Chloride | 1.2 | 49 |

EXAMPLE 3

The superiority of the organoclay for sorption of organics was further investigated. The sorption of three forms of organoclay at various loading rates for 12 priority organics in water were compared with activated charcoal in laboratory experiments and these results are shown in the following Table 5.

reduced volatile organics emanating from it. This is reflected in organic sniffer results in Table 6.

These solids can be handled easily with conventional equipment such as trucks and front-end loaders. It was also determined that leaching of the solidified waste reduces the amount of organics that leach into the aqueous phase from 200 ppm to 20 ppm.

TABLE 6

| | Sniffer, ppm in Gas Phase |
|---|---|
| 20% waste, 2% organoclay 78% kiln dust | 18 |
| 20% waste, 5% organoclay 75% kiln dust | 3 |
| 20% waste, 10% organoclay 70% kiln dust | 0 |
| 20% waste, 80% kiln dust | 90 |
| 20% waste, 2% organoclay 78% fly ash | 0 |
| 20% waste, 5% organoclay 75% fly ash | 0 |
| 20% waste, 10% organoclay 70% fly ash | 0 |
| 20% waste, 80% fly ash | 90 |

EXAMPLE 5

Volatile organics emanating from landfarm disposal

TABLE 5

| | | PERCENTAGES OF SORPTION | | | | | | | | | |
|---|---|---|---|---|---|---|---|---|---|---|---|
| Concentration of Organic | Clay Type | Dimethyl Benzyl (Hydrogenated Tallow) Ammonium Bentonite | | | Di(hydrogenated Tallow) Dimethyl Ammonium Bentonite | | | Methylbis (2-hydroxyethyl) Octodecyl Ammonium Bentonite | | | Carbon |
| ug/1 (ppb) | Clay Dose (mg/L): | 130 | 660 | 1300 | 130 | 660 | 1300 | 130 | 660 | 1300 | 130 |
| 1,000 | Chloroform | 64 | 49 | 56 | 47 | 55 | 43 | 42 | 49 | 51 | 27 |
| 1,000 | 1,2 Dichloroethane | 46 | 36 | 50 | 48 | 49 | 42 | 34 | 29 | 36 | 40 |
| 1,000 | 1,1,1 Trichlorethane | 60 | 55 | 54 | 40 | 49 | 40 | 36 | 43 | 45 | 30 |
| 1,000 | Trichloroethylene | 27 | 24 | 25 | 12 | 43 | 9 | 5 | 13 | 22 | 86 |
| 1,000 | Tetrachlorethylene | 85 | 46 | 74 | 47 | 51 | 74 | 11 | 39 | 60 | 92 |
| 700 | 2 Nitrophenols | 84 87 | 99 96 | ND | 27 | 92 87 | 97 94 | 49 84 | 91 95 | 97 96 | 85 |
| 750 | Pentachlorophenol | ND | ND | ND | ND | ND | ND | ND 94 | 92 | ND | 94 |
| 400 | Dimethyphthalate | 85 | ND | ND | 92 94 | ND | ND | 70 | ND | ND | 92 |
| 400 | Lindane | 99.7 93 | ND | ND | 99.9 85 | ND 98 | ND | 99.9 | ND | ND | — |
| 100 | Aroclor 1254 | 40 29 | 90 88 | 95 94 | 88 77 | 98 90 | 98 95 | 81 74 | 84 65 | 92 89 | 99.7 |
| 15 | Ethyl Benzene | 29 | 16 | 22 | 13 | 24 | 71 | 8 | 16 | — | — |

ND = Not Detected

EXAMPLE 4

Figure 2:
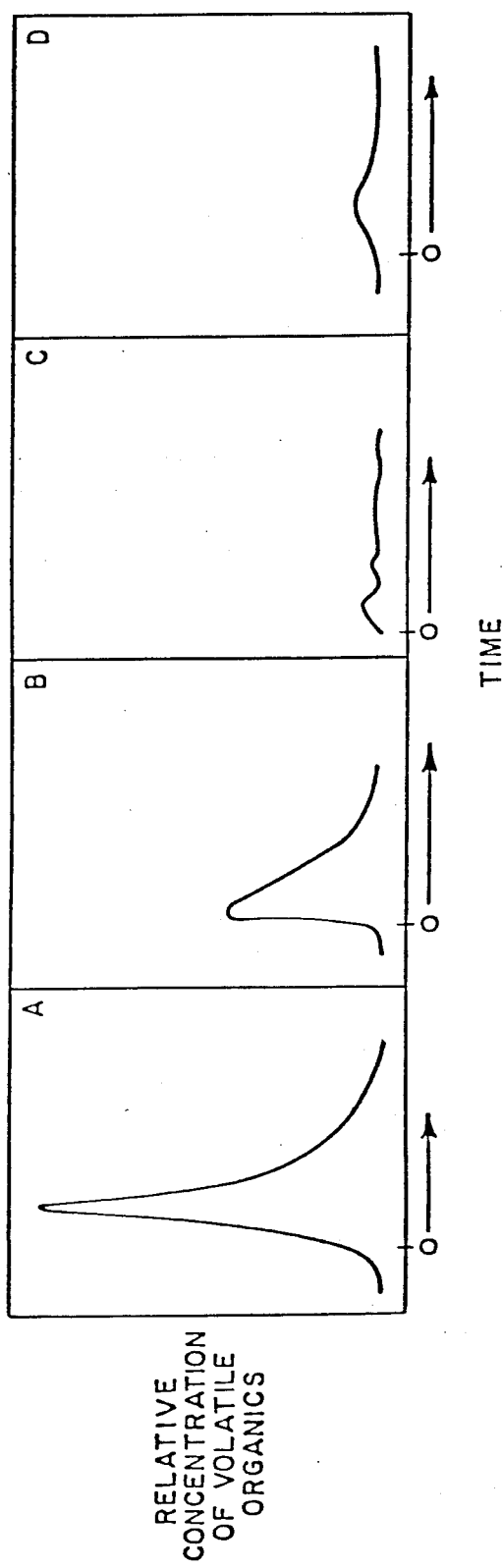
FIG. 2 is a graph illustrating organic emissions from a simulated land farm disposal of petroleum sludge.

Experiments were conducted on solidifying industrial Class I toxic wastes. The organoclay utilized was a dimethyl di(hydrogenated tallow) ammonium bentonite. It was found that about ten percent (10%) organoclay by weight of the solidified matrix is sufficient to solidify the waste. The solidified waste had drastically reduced volatile organics emanating from it. This is of petroleum sludge can be reduced by application of organoclay. FIG. 2, A and B, illustrate, respectively, initial emissions from an untreated landfarm waste in soil and landfarm waste which was treated in soil with a thin layer of organoclay sprinkled onto the waste burdened surface. The magnitude of the emissions resulted from physically disturbing the landfarmed waste by disking or tilling, a normal commercial practice. FIG. 2, C and D, illustrate, respectively, the volatile organic concentration resulting from tilling the organoclay treated surface 24 and 72 hours after treatment. It can be seen that after the first disking, the emissions were reduced essentially to background levels. For up to ten days after the initial waste implacement, this same low level quantity of emissions occured even when the landfarm was disked repeatedly. Applications of organoclay also tended to solidify the waste-burdened surface producing a mechanically superior surface. Vehicles could travel over the organoclay treated area sooner after the waste was applied. Currently, industrial landfarm operations are delayed about three days between waste applications to ensure that there is a stable surface for heavy equipment. It is not uncommon for landfarm vehicles to become stuck in areas where the wastes are not percolating into the soil rapidly enough to accommodate a mechanically stable surface. Application of organoclay to these surfaces alleviated this situation.

EXAMPLE 6

The solidification of organic waste with organoclays also has the advantage of reducing the final disposal volume of the solidified waste. Table 8 contains examples of two wastes solidified in a conventional way versus solidification with the method of this invention using an organoclay.

TABLE 7

|  | Volume of Conventional Solidification (yd$^3$) | Volume of Organoclay Solidification (yd$^3$) |
|---|---|---|
| 1 square yard of class 1 toxic waste | 4 | 1.4 |
| 1 square yard of class 2 toxic waste | 4.97 | 1.1 |

EXAMPLE 7

In one series of tests a specific waste containing about forty percent (40%) water by weight was solidified according to established practice and by the method of this invention, with and without decanting. The organoclay utilized was a dimethyl di(hydrogenated tallow) ammonium bentonite. Details are set out in Table 8.

It can be seen from Table 8 that the major advantages of this invention are achieved.

TABLE 8

SOLIDIFICATION OF AN API (AMERICAN PETROLEUM INSTITUTE) SEPARATOR SLUDGE WITH CONVENTIONAL FLY ASH TREATMENT AND THE METHOD OF THIS INVENTION

|  | Conventional[4] | Method of the Invention | |
|---|---|---|---|
|  |  | Without Decanting | With Decanting |
| Volume of Waste (cc) | 1,000 | 1,000 | 1,000 |
| Weight of Waste (g) | 890 | 890 | 890 |
| Weight of Fly Ash (g) | 3,846 | — | — |
| Weight of Organo-Clay (g) | — | 22 | 22 |
| Weight of Attapulgite (g) | — | 423 | 180 |
| Weight After Solidification (g) | 4,736 | 1,335 | 1,092 |
| Volume After Solidification (cc) | 4,850 | 1,550 | 800 |
| Sniffer Test (ppm in gas phase)[1] | 90 | <1 | <1 |
| TOC[3] in Leachate (ppm)[2] | 50 | 20 | — |

[1]Samples were placed in capped bottles and allowed to stand for 24 hours. The head space in the bottles was then measured with a TLV sniffer that was standardized against methane.
[2]The waste was leached in a pH-adjusted neutral water solution for 24 hours with a ratio of 10:1 for water to waste.
[3]TOC - Total Organic Content.
[4]Fly ash only.

EXAMPLE 8

The waste of Example 7 was approximately forty percent (40%) water. A waste with low percentage water and high viscosity was solidified. The results are shown in Table 9. In this case, the volume also was substantially reduced. This can result in substantial savings in mixing, transporation, and disposal site cost.

TABLE 9

SOLIDIFICATION OF A VISCOUS WASTE THAT CONTAINS LESS THAN 10% WATER

|  | Conventional | Method of Invention[1] |
|---|---|---|
| Waste Volume (cc) | 1,000 | 1,000 |
| Weight of Waste (g) | 930 | 930 |
| Weight of Fly Ash (g) | 2,150 | — |
| Weight of Organoclay (g) | — | 23 |
| Weight of Attapulgite (g) | — | 288 |
| Weight After Solidification (g) | 3,080 | 1,241 |
| Volume After Solidification (cc) | 3,300 | 1,300 |

[1]No decanting. The clay utilized was a dimethyl di(hydrogenated tallow) ammonium bentonite.

EXAMPLE 9

Figure 3:
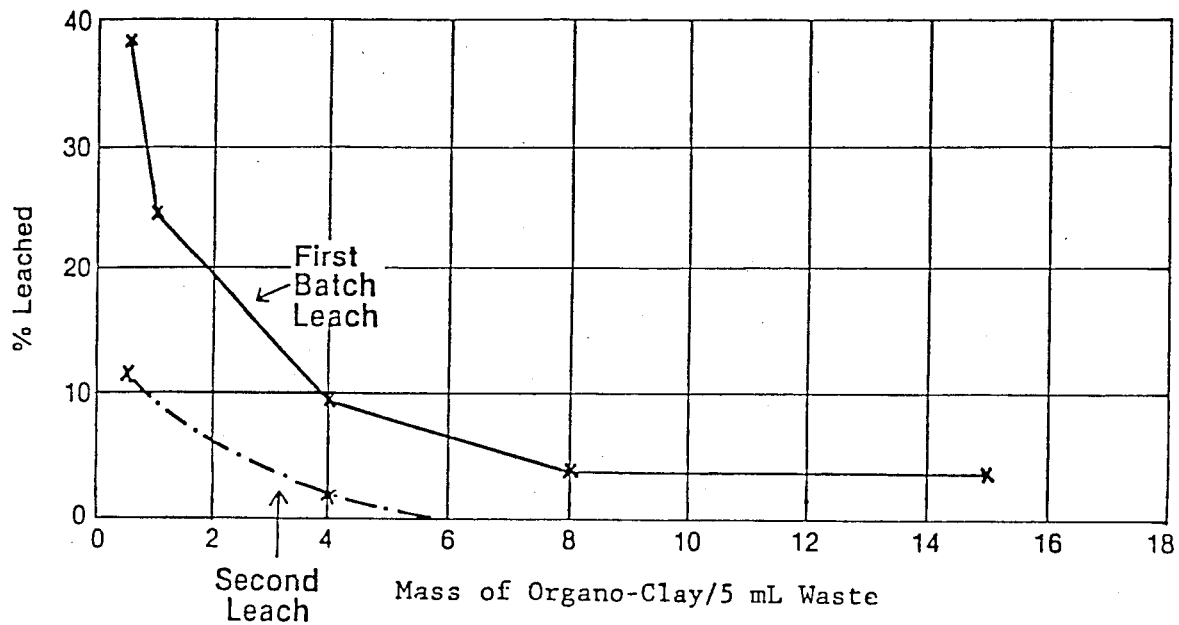
FIG. 3 is a graphical representation of the sequential leaching of a solidified waste containing 1% hexachlorocyclopentadiene and 1% ethyl parathion (Example 9).

In order to illustrate more quantitatively the change in leach rate achievable by employing the invention, a third waste containing 8% dichlorobenzene, 1% hexachlorocyclopentadiene, and 1% ethyl parathion was solidified and leached. The solidifications were conducted employing 0.5, 1, 2, 4, 8, and 15 grams of the organoclay and 5 milliliters of waste. The leachings were conducted for 24 hours. The results for the first batch leaching results are given in Table 10. It can be seen that substantial lowering of leach rate was obtained. A second batch leaching was performed on the same waste and the results of that leaching can be seen in Table 11. The leach rate was reduced even further in this second sequential leach. The results of these two leachings are presented graphically in FIG. 3.

TABLE 10

LEACHING RESULTS FOR SOLIDIFIED WASTE CONTAINING 1% HEXACHLOROPENTADIENE AND 1% ETHYL PARATHION

| Mass of Sorbent (g) | pH 3 HCP | pH 3 Parathion | pH 7 HCP | pH 7 Parathion | pH 11 HCP | pH 11 Parathion |
|---|---|---|---|---|---|---|
| 15 | 0% | 0% | 0% | 4.1% | 0% | 17.1% |
| 8 | 0% | 3.8% | 0% | 3.9% | 0% | 20% |
| 4 | 0% | 4.2% | 0% | 9.5% | 0% | 21.4% |
| 2 | 0% | 6.9% | 0% | 3.4% | 0% | 24.3% |
| 1. |  |  | 0% | 24.5% | 0.82% | 37.1% |
| .5 | 0% | 12.9% | 3.4% | 38.1% | 4.9% | 81.4% |

*100% is defined as the amount that leaches from conventional solidification with fly ash.

TABLE 11

PERCENT OF ORGANICS LEACHED IN SECOND BATCH EQUILIBRATION FOR WASTE CONTAINING 1% HEXACHLOROPENTADIENE, 1% ETHYL PARATHION, AND 8% DICHLOROBENZENE

| Mass of Sorbent (g) | HCP (%) | Parathion (%) | 1,2-Dichlorobenzene (%) |
|---|---|---|---|
| 15 | 0 | 0 | 0 |
| 8 | 0 | 0 | 0 |
| 4 | 0 | 2 | 0 |
| 2 |  | 0 | 16 |
| 1 | 0 | 0 | 25 |
| 0.5 | 16 | 13.5 | 16 |

*100% is defined as the amount that will leach from the waste if solidified with fly ash.

EXAMPLE 10

Figure 4:
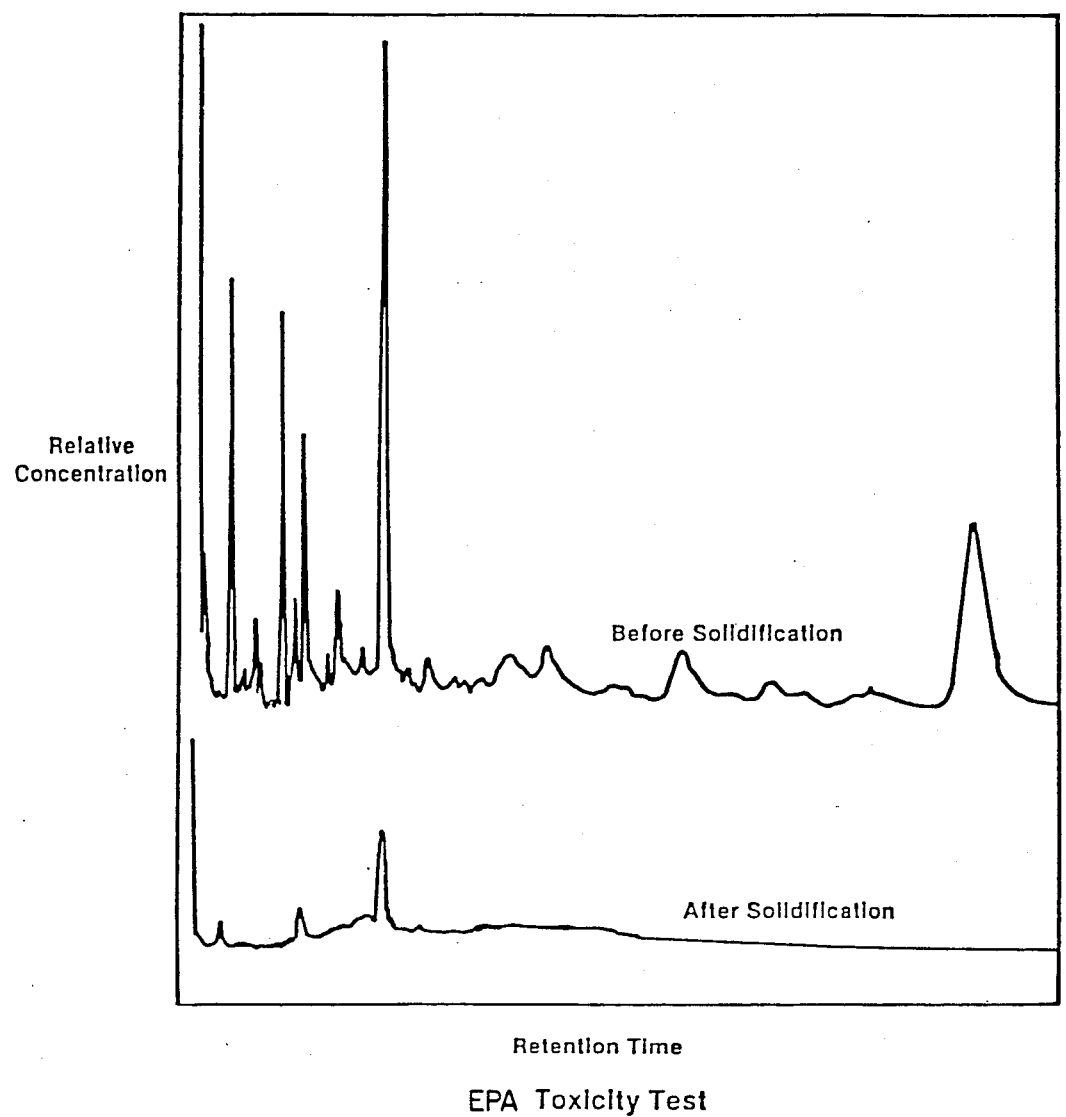
FIG. 4 is a gas chromatagraphic (GC) analysis of the leached original waste and the leached solidified product of this invention (Example 10).

An example of the effect on leaching of organoclays on highly toxic waste can be seen in solidification of a waste obtained from Rocky Mountain Arsenal in Denver, Colo. The problems associated with these wastes have been widely-known and publicized in the Rocky Mountain area. This waste contained large amounts of industrial by-products and pesticides. This waste was solidified employing 5% by weight of a dimethyl di(hydrogenated tallow) ammonium bentonite organoclay, 30% attapulgite, and 80% cement. The waste was then subjected to the standard EPA extraction procedure. The extract was then analyzed for residues of the host of organics present in the original waste. Gas chromatographic analyses of the leached original waste and the leached solidified product are given in FIG. 4. It is clear that the method of this invention greatly reduces the leaching of the organics from this waste.

EXAMPLE 11

Table 13 shows examples of the effectiveness of the organoclays in breaking organic-water emulsions.

TABLE 12

ORGANOCLAY APPLIED TO BREAKING OF ORGANIC WATER EMULSIONS

| Type of Emulsion | Composition | Organoclay[1] Dose (% of Composition) | Percent of Water Recovered |
|---|---|---|---|
| Texaco API Separator Sludge | 60% organic 40% water | 2.5% | 98% |
| Amoco API Separator Sludge | 80% organic 20% water | 2.5% | 95% |
| BFI Hazardous Waste | ⅓ solids ⅓ organic ⅓ water | 2.5% | 98% |
| Alcoa Rolling Mill Emulsion | 10% solids 40% organic 50% water | 7% | 90% |

[1]Organoclay utilized was a dimethyl di(hydrogenated tallow) ammonium bentonite.

Although the invention has been described in conjunction with the foregoing specific embodiments, many alternatives, variations and modifications are intended to fall within the spirit and scope of the appended claims.

I claim:

1. A method of treating a polar fluid composition containing an amount of organic contaminant to substantially immobilize the contaminant to facilitate disposal, comprising:
    (a) adding a sufficient amount of an organoclay to a fluid composition containing an organic contaminant which is substantially insoluble in the polar fluid to a absorb substantially all of the contaminant, said organoclay being the previously prepared solid reaction product of a quaternary ammonium salt and a smectite-type clay; and
    (b) adding a sufficient amout of solid adsorbent to adsorb or react with substantially all of the polar fluid to form a substantially non-flowable matrix.

2. The method of claim 1, wherein the fluid composition is an emulsion.

3. The method of claim 1, wherein the organoclay is a higher dialkyl dimethyl ammonium organoclay.

4. The method of claim 1, wherein the organoclay is a benzyl ammonium organoclay.

5. The method of claim 1, wherein the organoclay is a ethylhydroxy ammonium organoclay.

6. The method of claim 1, wherein the solid adsorbent is attapulgite.

7. The method of claim 2, wherein the solid adsorbent is cement.

8. The method of claim 1, wherein the solid adsorbent is fly ash.

9. The method of claim 1, wherein the solid adsorbent is saw dust.

10. The method of claim 1, wherein the solid adsorbent is soil.

11. The method of claim 1, wherein the solid adsorbent is kiln dust.

12. The method of claim 1, wherein the amount of organoclay is at least about 1% by weight of the amount or organic contaminant.

13. The method of claim 12, wherein the amount of organoclay is a maximum of about 10% by weight of the amount of organic contaminant.

14. The method of claim 1, wherein the amount of solid adsorbent is from about 10% to about 100% by weight of the organic contaminant.

15. The method of claim 1, wherein the organoclay and solid adsorbent are added substantially simultaneously to the fluid composition.

16. A method of treating an aqueous fluid composition containing an amount of organic contaminant to substantially immobilize the contaminant to facilitate disposal, comprising:
    (a) adding a sufficient amount of organoclay to an aqueous composition containing an organic contaminant which is substantially insoluble in water to absorb substantially all of the contaminant, said organoclay being the previously prepared solid reaction product of a quaternary ammonium salt and a smectite-type clay; and
    (b) adding a sufficient amount of solid adsorbent to adsorb or react with substantially all of the water to form a substantially non-flowable matrix.

17. The method of claim 16 further comprising, after the step of adding the organoclay, removing a portion of the water.

18. The method of claim 16, wherein the amount of organoclay is at least about 5% by weight of the amount of organic contaminant.

* * * * *